United States Patent
Choi et al.

(10) Patent No.: US 11,264,650 B2
(45) Date of Patent: Mar. 1, 2022

(54) APPARATUS AND METHOD FOR TESTING END PLATE

(71) Applicant: LG Chem, Ltd., Seoul (KR)

(72) Inventors: Jee-Soon Choi, Daejeon (KR); Jin-Hak Kong, Yuseong-gu (KR); Dong-Yeon Kim, Yuseong-gu (KR); Yong-Seok Choi, Daejeon (KR)

(73) Assignee: LG Energy Solution, Ltd.

( * ) Notice: Subject to any disclaimer, the term of this patent is extended or adjusted under 35 U.S.C. 154(b) by 238 days.

(21) Appl. No.: 16/341,110

(22) PCT Filed: Apr. 3, 2018

(86) PCT No.: PCT/KR2018/003937
§ 371 (c)(1),
(2) Date: Apr. 11, 2019

(87) PCT Pub. No.: WO2018/190557
PCT Pub. Date: Oct. 18, 2018

(65) Prior Publication Data
US 2020/0044293 A1    Feb. 6, 2020

(30) Foreign Application Priority Data

Apr. 13, 2017 (KR) .................. 10-2017-0048064

(51) Int. Cl.
*H01M 10/42* (2006.01)
*H01M 50/20* (2021.01)
(52) U.S. Cl.
CPC ... *H01M 10/4285* (2013.01); *H01M 10/4207* (2013.01); *H01M 50/20* (2021.01)
(58) Field of Classification Search
CPC ......... H01M 10/4207; H01M 10/4285; H01M 2/1077
See application file for complete search history.

(56) References Cited

U.S. PATENT DOCUMENTS 8,999,557 B2    4/2015    Kim
9,263,759 B2    2/2016    Suh et al.
(Continued)

FOREIGN PATENT DOCUMENTS

CN    102338609 A    2/2012
CN    106532156 A    3/2017
(Continued)

OTHER PUBLICATIONS

Extended European Search Report for Application No. EP18784953.4, dated Dec. 12, 2019, pp. 1-3.
(Continued)

*Primary Examiner* — Jonathan G Jelsma
(74) *Attorney, Agent, or Firm* — Lerner, David, Littenberg, Krumholz & Mentlik, LLP (57) ABSTRACT

An apparatus and method for testing the strength of an end plate mounted in a battery module. The apparatus includes a memory unit configured to store a first parameter representing a number of battery cells included in the battery module, a second parameter representing a spring constant of a battery cell and a third parameter representing a spring constant of the end plate, and a control unit configured to generate a one-dimensional model associated with the battery module based on the first parameter, calculate a first F-D curve based on the second and third parameters and the one-dimensional model, and store first reference data representing the first F-D curve in the memory unit. The first F-D curve corresponds to a relationship between a deformation amount and a load of the end plate according to the number of battery cells represented by the first parameter.

11 Claims, 9 Drawing Sheets

(56) References Cited

U.S. PATENT DOCUMENTS

| | | |
|---|---|---|
| 2013/0316210 A1 | 11/2013 | Morita et al. |
| 2015/0160302 A1 | 6/2015 | Xu et al. |
| 2015/0188198 A1 | 7/2015 | Bonhomme et al. |
| 2017/0074634 A1 | 3/2017 | Yoon et al. |

FOREIGN PATENT DOCUMENTS

| | | |
|---|---|---|
| JP | 2009-259194 A | 11/2009 |
| JP | 2010-228605 A | 10/2010 |
| JP | 2013-026201 A | 2/2013 |
| JP | 2013026201 A | 2/2013 |
| JP | 5194524 B2 | 5/2013 |
| JP | 2013-157279 A | 8/2013 |
| JP | 5664937 B2 | 2/2015 |
| JP | 2015-225846 A | 12/2015 |
| JP | 2017-037705 A | 2/2017 |
| KR | 10-0954526 B | 4/2010 |
| KR | 20130027166 A | 3/2013 |
| KR | 20160015052 A | 2/2016 |
| KR | 20160050843 A | 5/2016 |

OTHER PUBLICATIONS

International Search Report for PCT/KR2018/003937, dated Jul. 24, 2018, 2 pages.
List of Documents cited from Indian Office Action for Application No. 201917017496 dated Mar. 9, 2021; 2 pages.

APPARATUS AND METHOD FOR TESTING END PLATE

CROSS-REFERENCE TO RELATED APPLICATIONS

The present application is a national phase entry under 35 U.S.C. § 371 of International Application No. PCT/KR2018/003937 filed Apr. 3, 2018, published in Korean, which claims priority from KR 10-2017-0048064 filed Apr. 13, 2017, all of which are incorporated herein by reference.

TECHNICAL FIELD

The present disclosure relates to an apparatus and method for testing an end plate, and more particularly, to an apparatus and method for testing a pair of end plates used to manufacture a battery module.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel cadmium batteries, nickel hydrogen batteries, nickel zinc batteries, lithium batteries and the like, and among them, lithium batteries have little or no memory effect, and thus they are gaining more attention than nickel-based batteries for their advantages of free charging/discharging, low self-discharging and high energy density.

Particularly, a battery module used in an electric vehicle or an energy storage system (ESS) includes a plurality of battery cells for high output and large capacity. Additionally, a pair of end plates provided in the battery module supports a stack of the plurality of battery cells in two directions, thereby restricting the movement of the stack and protecting the stack from external forces.

Meanwhile, swelling may occur in the battery cell by gas produced in the battery cell or a concentration difference of lithium filled in the negative electrode. Swelling causes a shape change of the battery cell. That is, as the battery cell is repeatedly charged and discharged, the thickness gradually increases with the increasing amount of gas. Accordingly, as the battery cells of the stack get degraded, the load transmitted from the stack to the pair of end plates increases. Moreover, the higher the temperature, the state of charge and the Open Circuit Voltage (OCV) of the battery cell, the severer the swelling.

In relation to this, when the stiffness of the end plate is too low, the end plate may be easily damaged by deformation of the battery stack. Additionally, when the stiffness of the pair of end plates is too high, swelling of the battery cells included in the battery stack is very restricted, and there is a risk that the battery cell may explode.

DISCLOSURE

Technical Problem

The present disclosure is designed to solve the above-described problem, and therefore the present disclosure is directed to providing an apparatus and method for testing if an end plate has suitable stiffness to support a stack of a battery module in two directions.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

Various embodiments of the present disclosure for achieving the above-described object are as follows.

A testing apparatus according to an aspect of the present disclosure is configured to test an end plate mounted in a battery module. The testing apparatus includes a memory unit configured to store a first parameter representing the number of battery cells included in the battery module, a second parameter representing a spring constant of a battery cell of the battery cells included in the battery module and a third parameter representing a spring constant of the end plate, and a control unit configured to generate a one-dimensional model associated with the battery module based on the first parameter, calculate a first force-distance (F-D) curve based on the second parameter, the third parameter and the one-dimensional model, and store first reference data representing the first F-D curve in the memory unit. In this instance, the first F-D curve corresponds to a relationship between a deformation amount and a load of the end plate according to the number of battery cells represented by the first parameter.

Additionally, the one-dimensional model is to simulate a structure in which a front surface and a rear surface of a battery stack are supported by the end plate, the battery stack including the number of battery cells represented by the first parameter stacked in a sequential order.

Additionally, the control unit is configured to calculate an equivalent spring constant of the one-dimensional model using:

$$K_{eq} = \frac{K1 \times K2}{(2 \times K1) + (n \times K2)}$$

wherein $K_{eq}$ is the equivalent spring constant, n is the number of battery cells, K1 is the spring constant of the battery cell, and K2 is the spring constant of the end plate.

Additionally, the control unit is configured to calculate the first F-D curve using:

$$F = K_{eq} \times n \times \Delta x_c = K2 \times \Delta x_e$$

wherein F is a load applied to the end plate, $\Delta x_c$ is a deformation amount of the battery cell, and $\Delta x_e$ is a deformation amount of the end plate.

Additionally, the memory unit may be further configured to store second reference data representing a second F-D curve. The control unit may be configured to calculate a third F-D curve based on the first parameter and the second F-D curve. In this case, the second F-D curve corresponds to a relationship between the deformation amount of the battery cell and a reaction force of the battery cell, and the third F-D curve corresponds to a relationship between a deformation amount of the battery stack and a reaction force of the battery stack.

Additionally, the control unit may be configured to calculate coordinates of an intersection point of the first F-D curve and the third F-D curve, and determine the deformation amount and the load of the end plate caused by swelling of the number of battery cells represented by the first parameter based on the coordinates of the intersection point.

Additionally, the control unit may be configured to output a first test result signal when the coordinates of the intersection point are within a preset reference range. The first test result signal may notify that the end plate passes a predefined design standard.

Additionally, the control unit may be configured to output a second test result signal when the coordinates of the intersection point are outside of the preset reference range. The second test result signal may notify that the end plate fails to pass a predefined design standard.

Additionally, the control unit may be configured to adjust the first parameter when the coordinates of the intersection point are outside of a preset reference range.

Additionally, the control unit may be configured to adjust the third parameter when the coordinates of the intersection point are outside of a preset reference range.

Advantageous Effects

According to at least one of the embodiments of the present disclosure, it is possible to determine if an end plate has enough stiffness to withstand a load caused by swelling of a plurality of battery cells included in a stack without actually manufacturing a battery module.

Additionally, according to at least one of the embodiments of the present disclosure, it is possible to identify beforehand an amount of deformation of an end plate caused by swelling of a plurality of battery cells included in a stack without actually manufacturing a battery module.

The effects of the present disclosure are not limited to the above-mentioned effects, and another effect not mentioned herein will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide further understanding of the technical aspects of the present disclosure, and thus, the present disclosure should not be construed as being limited to the drawings.

MODE FOR CARRYING OUT THE INVENTION

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time the application was filed.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like are used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term "control unit" as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

Figure 1:
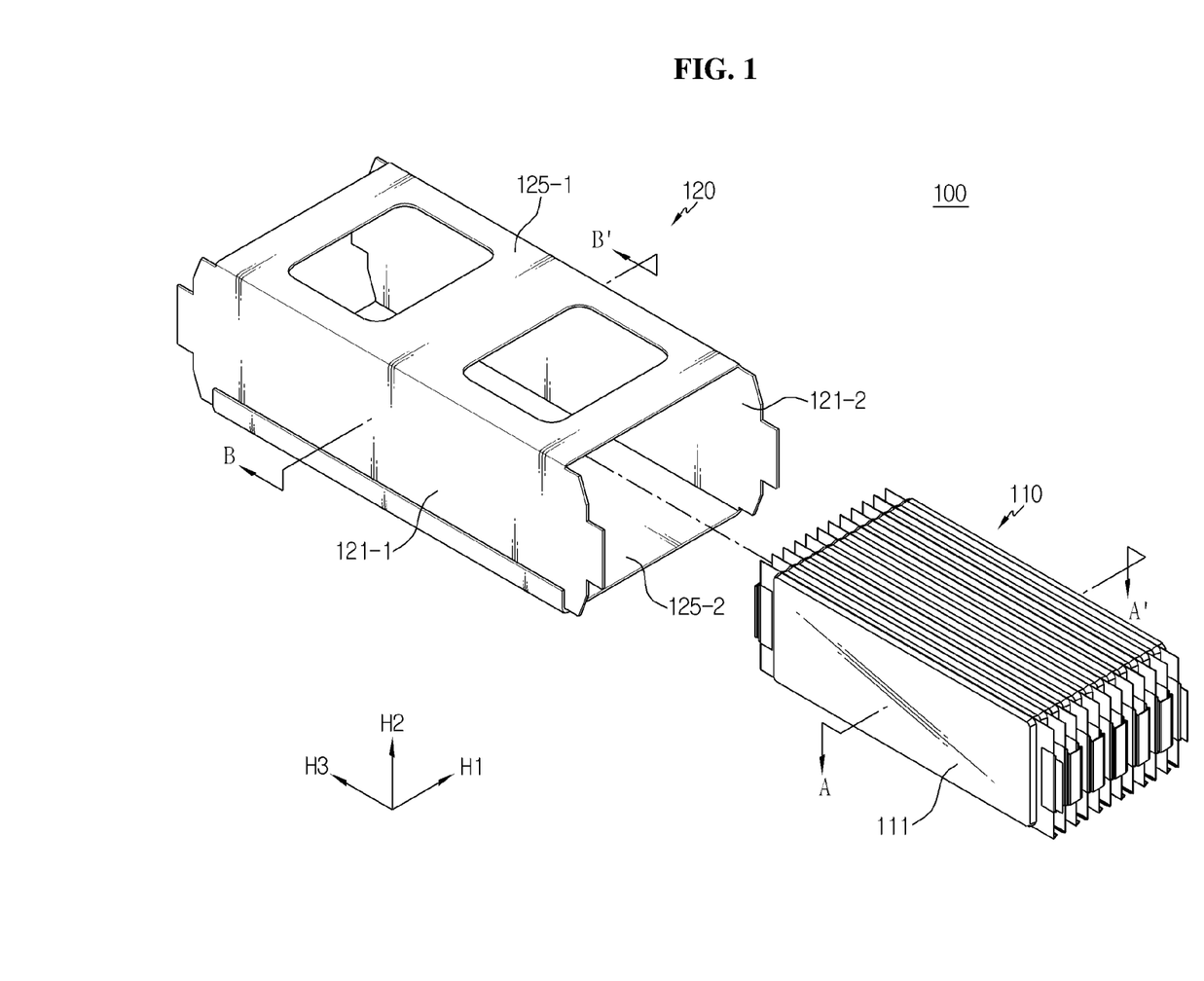
FIG. 1 is a schematic diagram of a battery module according to an embodiment of the present disclosure.

FIG. 1 is a schematic diagram of a battery module 100 according to an embodiment of the present disclosure.

Referring to FIG. 1, the battery module 100 includes a battery stack 110 and a case 120. The battery module 100 may be mounted in a vehicle such as a hybrid electric vehicle to supply electrical energy for driving an electric motor provided in the vehicle. Of course, the battery module 100 may be also mounted in energy storage systems and smartphones.

In FIG. 1, it is assumed that the H1 axis corresponds to the width-wise direction of the battery module 100 and the thickness-wise direction of the battery cell 111, the H2 axis corresponds to the height-wise direction of the battery module 100, and the H3 axis corresponds to the length-wise direction of the battery module 100.

The battery stack 110 includes a plurality of battery cells 111. In the battery stack 110, the plurality of battery cells 111 is stacked in a sequential order along a predefined direction (e.g., H1 axis). To this end, the battery stack 110 may optionally further include a cartridge.

The type of the battery cell 111 included in the battery stack 110 is not limited to a particular type. The battery cell 111 may include any type of rechargeable battery cell such as lithium ion batteries, lithium polymer batteries, nickel cadmium batteries, nickel hydrogen batteries and nickel zinc batteries. Additionally, the battery cell 111 may be classified into pouch type, cylindrical and prismatic according to the type of case. The battery cells 111 included in the battery stack 110 may be electrically connected to each other with a series structure, a parallel structure or a combined series-parallel structure.

Each cartridge is mechanically coupled with at least one battery cell 111 to provide a structure in which the battery cell 111 is stably fixed in the battery stack 110. Additionally, the cartridge may have a shape that can be coupled with adjacent other cartridge directly or through bolts.

The module case 120 includes a pair of end plates 121-1, 121-2 and at least one strap 125. Each end plate 121 and each strap 125 may be coupled with each other through various methods (e.g., welding, bolts). Alternatively, the module case 120 may be integrally formed through an insert molding method.

The module case 120 has an empty space inside, and provides a structure in which the battery stack 110 is received in the empty space. Additionally, the module case 120 may be provided such that the battery stack 110 can be inserted or replaced through the open part of the module case 120.

When the battery stack 110 is received in the module case 120, one 121-1 of the pair of end plates 121-1, 121-2 adjoins a first surface of the battery stack 110 and the other 121-2 adjoins a second surface of the battery stack 110. The first surface and the second surface of the battery stack 110 may face opposite directions. Accordingly, each of the pair of end plates 121-1, 121-2 supports the battery stack 110 by pressing the battery stack 110 in two directions. That is, the end plate 121-1 may press the first surface of the battery stack 110 against the second surface, and the end plate 121-2 may press the second surface of the battery stack 110 against the first surface.

Figure 2:
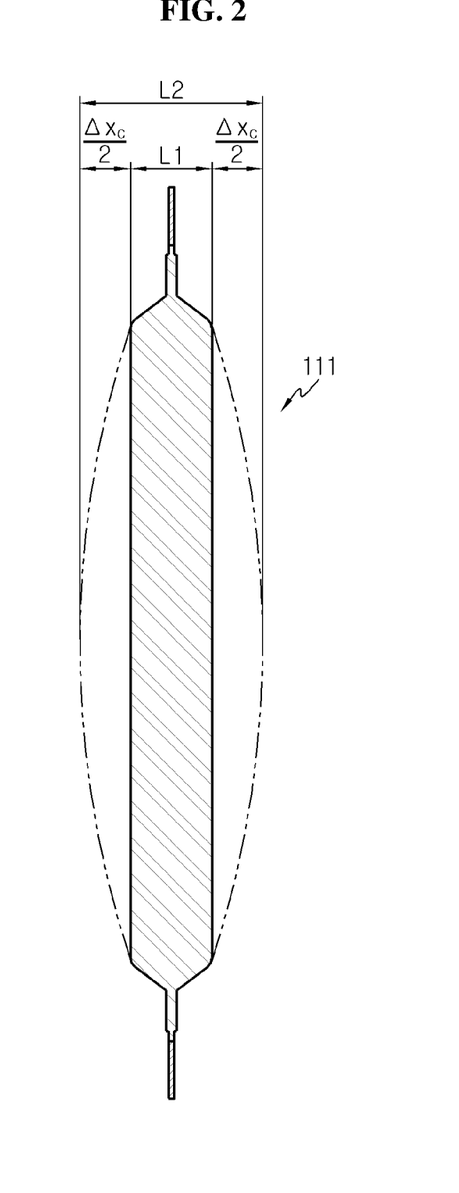
FIG. 2 is a schematic cross-sectional view of a battery cell taken along the line A-A' of FIG. 1.

FIG. 2 is a diagram showing deformation of the battery cell 111 in relation to an embodiment of the present disclosure. FIG. 2 is a cross-sectional view of the battery cell 111 when the battery stack 110 is taken along the line A-A' of FIG. 1.

Referring to FIG. 2, each battery cell 111 may have a first thickness L1 when in stable state, and a second thickness L2 when in limited state. Here, the thickness of the battery cell 111 may refer to a maximum length of the single battery cell 111 in stack direction (i.e., H1 axis in FIG. 1) of the battery stack 110.

Additionally, the stable state may refer to a state in which there is no or very little expansion of the battery cell 111 caused by swelling. For example, when a State Of Health (SOH) is in a predefined range (e.g., 80% or more), a State Of Charge (SOC) is in a predefined range (e.g., less than 70%) and the temperature is in a predefined range (e.g., lower than 30 degrees), the battery cell 111 is determined to be in stable state.

Additionally, the limited state may refer to a state in which the battery cell 111 is expanded to the maximum due to swelling. For example, when the SOH is in a predefined range (e.g., less than 80%), the SOC is in a predefined range (e.g., 70% or more) and the temperature is in a predefined range (e.g., 45 degrees or above), the battery cell 111 is determined to be in limited state. The first thickness L1 and the second thickness L1 may be pre-determined through previous experiments of a predefined number of battery cells 111.

As the battery cell 111 goes from stable state to limited state, the central part of the battery cell 111 gradually swells, and the maximum value of thickness deformation amount of the battery cell 111 may be equal to L2−L1.

While the battery cell 111 is in stable state, the load applied to the end plate 121 by the expansion of the battery cell 111 is little or negligibly small. In contrast, when the battery cell 111 gradually goes to limited state, the load applied to the end plate 121 by the expansion of the battery cell 111 gradually increases and is no longer negligible.

Accordingly, it is required to check beforehand if the end plate 121 can properly press the battery stack 110 before actually manufacturing the end plate 121 designed by the engineer.

Figure 3:
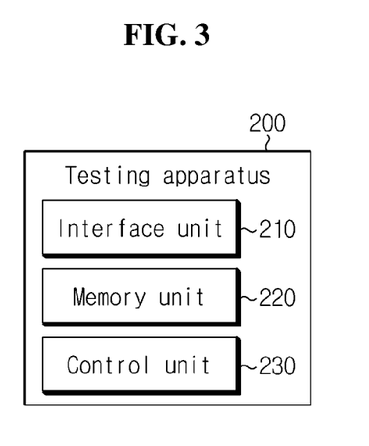
FIG. 3 is a schematic diagram showing the configuration of a testing apparatus according to an embodiment of the present disclosure.

FIG. 3 is a schematic diagram showing the configuration of a testing apparatus 200 according to an embodiment of the present disclosure.

Referring to FIG. 3, the testing apparatus 200 is configured to test if the end plate 121 mounted in the battery module 100 as shown in FIG. 1 has suitable strength to support the battery stack 110, and may include an interface unit 210, a memory unit 220 and a control unit 230.

The interface unit 210 is in communication connection with an external device such as a user PC to transmit and receive data to/from the external device. The interface unit 210 is an optional component, and may be omitted from the testing apparatus 200 if necessary. The data received at the interface unit 210 from the external device may be stored in the memory unit 220.

The memory unit 220 is configured to store various types of software and data associated with the operation of testing the end plate 121. At least a portion of all the data stored in the memory unit 220 may be provided from the external device through the interface unit 210. The memory unit 220 may include at least one type of storage medium of a flash memory type, a hard disk type, a Solid State Disk (SSD) type, a Silicon Disk Drive (SDD) type, a multimedia card micro type, random access memory (RAM), static random access memory (SRAM), read-only memory (ROM), electrically erasable programmable read-only memory (EE-PROM) and programmable read-only memory (PROM).

The memory unit 220 stores a first parameter, a second parameter and a third parameter. The first parameter represents the number of battery cells 111 to be included in the battery stack 110. The second parameter represents the spring constant of the single battery cell 111. The third parameter represents the spring constant of the end plate 121. The memory unit 220 may further store second reference data as described below, and the second reference data represents a second force-distance (F-D) curve The second F-D curve corresponds to a relationship between a deformation amount and a reaction force of the single battery cell 111 in limited state.

The control unit 230 is connected to the interface unit 210 and the memory unit 220 allowing communication, and manages the transmission and reception of data through the interface unit 210 and performs a testing operation on the end plate 121 based on data provided from the memory unit 220. The control unit 230 may be implemented in hardware using at least one of application specific integrated circuits (ASICs), digital signal processors (DSPs), digital signal processing devices (DSPDs), programmable logic devices (PLDs), field programmable gate arrays (FPGAs), microcontrollers, microprocessors and electrical units for performing other functions.

Specifically, the control unit 230 generates a one-dimensional model corresponding to the battery module 100 based on the first parameter. The one-dimensional model will be described in more detail below with reference to FIG. 6.

Additionally, the control unit 230 calculates a first F-D curve based on the second parameter, the third parameter and the one-dimensional model. The first F-D curve may correspond to a relationship between a deformation amount and a load of the end plate 121 according to the number of battery cells 111 represented by the first parameter. That is, the first F-D curve may define the load transmitted from the battery stack to the end plate 121 caused by swelling of the battery cells 111 included in the battery stack 110, and consequentially, how much warpage occurs in the end plate 121. The control unit 230 may store first reference data representing the calculated first F-D curve in the memory unit 220.

Figure 4:
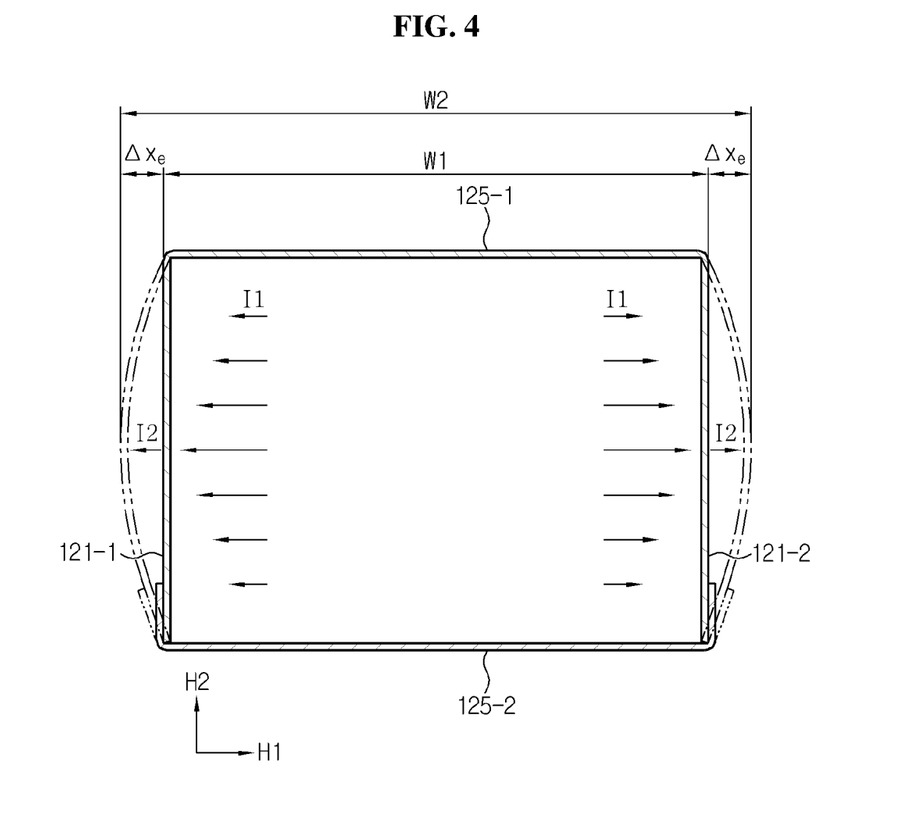
FIG. 4 is a schematic cross-sectional view of a battery module taken along the line B-B' of FIG. 1.

FIG. 4 is a schematic cross-sectional view of the battery module 100 taken along the line B-B' of FIG. 1. Referring to FIG. 4, deformation of the end plates 121-1, 121-2 caused by swelling of the battery cells 111 included in the battery stack 110 shown in FIG. 1 can be understood more easily.

When the respectively battery cell 111 expands due to swelling, the battery cell 111 deforms at the central part more than at the other parts, and thus the pair of end plates 121 also deforms at the central part the most. That is, warpage deformation occurs at the central part of each end plate 121.

I1 of FIG. 4 is related to the load transmitted from the battery stack 110 to the end plate 121, and I2 is related to deformation of the end plate 121 according to I1. Additionally, W1 of FIG. 4 denotes the width of the module case 120 while the battery cells 111 included in the battery stack are in stable state, and W2 of FIG. 4 denotes the width of the module case 120 while the battery cells 111 included in the battery electrode are in limited state. That is, when the battery cells 111 reaches limited state from stable state, each end plate 121 may deform by $\Delta x_e$. It is obvious to those skilled in the art that as the number of battery cells 111 included in the battery stack 110 increases, a difference between W2 and W1 will increase as well.

When the stiffness of the end plate 121 is very large, even though the battery cells 111 included in the battery stack 110 reach limited state, an overall width change of the battery module 100 will be absent or very small. That is, deformation of the battery cells 111 included in the battery stack 110 is limited too much, and as a consequence, a sudden explosion in the battery cell 111 may occur.

On the contrary, when the stiffness of the end plate 121 is very small, the end plate 121 cannot sufficiently limit a thickness change of the battery stack 110. That is, when the battery cells 111 included in the battery stack 110 reach limited state, the width of the battery module 100 is deformed too much, and as a consequence, the problem with disconnection of the electrical connection between the battery cells 111 included in the electrode assembly may occur.

Figure 5:
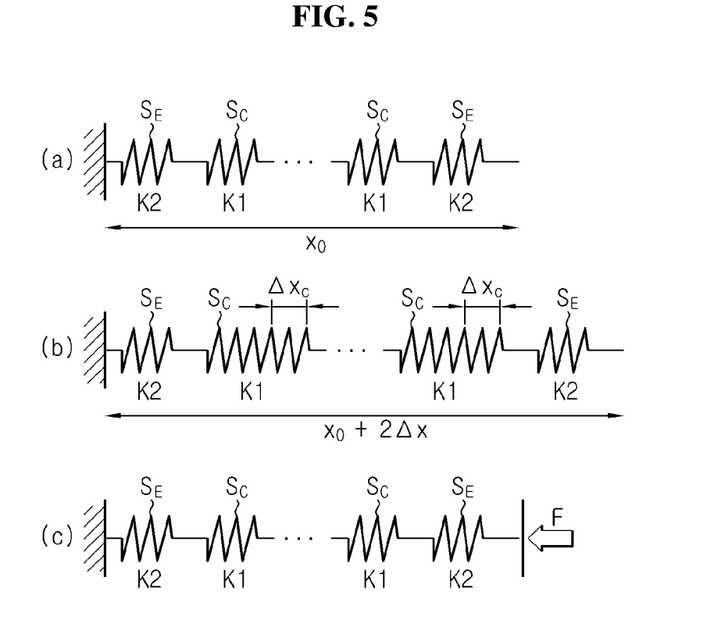
FIG. 5 is a schematic diagram of a one-dimensional model for simulating deformation of a battery module according to an embodiment of the present disclosure.

FIG. 5 is a schematic diagram of a one-dimensional model for simulating deformation of the battery module 100 according to an embodiment of the present disclosure.

In the present disclosure, the one-dimensional model simulates a structure in which the front surface (the first surface in FIG. 1) and the rear surface (the second surface in FIG. 1) of the battery stack 110 including the number of battery cells 111 represented by the first parameter stacked in sequential order are respectively supported by two end plates 121-1, 121-2.

The one-dimensional model may have a basic structure in which springs $S_C$ corresponding to the number of battery cells 111 represented by the first parameter are connected in series between two springs $S_E$ corresponding to the pair of end plates 121-1, 121-2. Hereinafter, for convenience of description, it is assumed that n battery cells 111 form the battery stack 110.

First, (a) of FIG. 5 shows a one-dimensional model when the battery cells 111 are in stable state. In this case, along the H1 axis (see FIG. 1), each spring $S_C$ may have a first basic length, and each spring $S_E$ may have a second basic length. Additionally, K1 may be the spring constant of the spring $S_C$ represented by the second parameter, and K2 may be the spring constant of the spring $S_E$ represented by the third parameter.

Subsequently, (b) of FIG. 5 shows a one-dimensional model when the battery cells 111 in the battery stack 110 are in limited state. In this case, each spring $S_E$ is maintained with the second basic length, while each spring $S_C$ has a length that is longer by $\Delta x_c$ than the first basic length. That is, $\Delta x_c$ may be a difference between the thickness of each battery cell 111 when each battery cell 111 is in stable state and the thickness of each battery cell 111 when each battery cell 111 is limited state while no load from the end plate 121 is applied. Accordingly, the total deformation amount of the battery stack 110 is (n×$\Delta x_c$).

Subsequently, (c) of FIG. 5 shows a one-dimensional model when each spring $S_C$ returns to the first basic length by the application of a force F from an end plate 121 to another end plate 121 while the battery cells 111 are in limited state. That is, the force F may be equal to a force required to compress the battery stack 110 in state as shown in (b) of FIG. 5 by (n×$\Delta x_c$).

Meanwhile, when the springs $S_C$ are connected in series between the springs $S_E$ in the one-dimensional model, the control unit 230 may calculate an equivalent spring constant of the one-dimensional model using the following Equation 1.

$$K_{eq} = \frac{K1 \times K2}{(2 \times K1) + (n \times K2)} \qquad <\text{Equation 1}>$$

Keq of Equation 1 denotes the equivalent spring constant of the one-dimensional model.

Meanwhile, the load F in (c) of FIG. 5 may be calculated using the following Equation 2.

$$F = K_{eq} \times n \times \Delta x_c = K2 \times \Delta x_e \qquad <\text{Equation 2}>$$

The deformation amount of the end plate 121 $\Delta x_e$ may be written by the following Equation 3 from Equation 1 and Equation 2.

$$\Delta x_e = \left\{ \frac{K1}{(2 \times K1) + (n \times K2)} \right\} \times n \times \Delta x_c \qquad <\text{Equation 3}>$$

The control unit 230 may calculate a first F-D curve (see C1 of FIG. 8) corresponding to a relationship between the deformation amount and the load of the end plate 121 from Equations 2 and 3.

Figure 6:
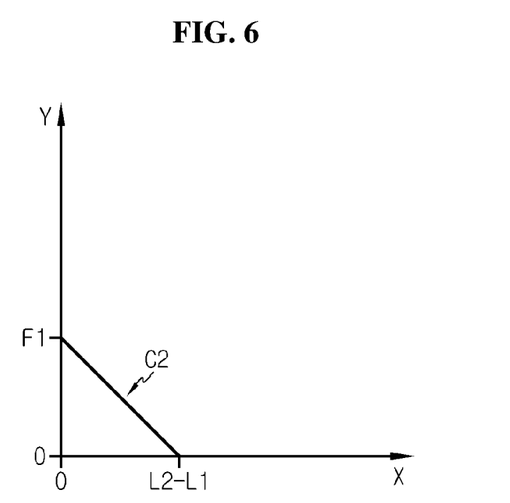
FIG. 6 is a graph showing a second F-D curve corresponding to a relationship between a thickness deformation amount and a reaction force of a single battery cell in limited state.
Figure 7:
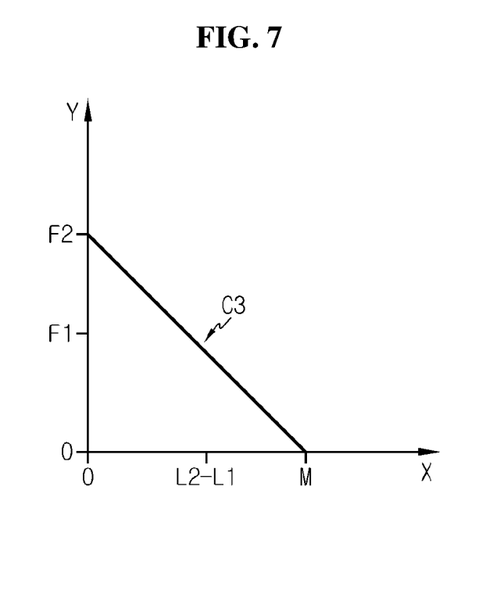
FIG. 7 is a graph showing a relationship of a thickness deformation amount and a reaction force of a battery stack.

FIG. 6 is a graph showing a second F-D curve C2 corresponding to a relationship between the thickness deformation amount and the reaction force of the single battery cell 111 in limited state, and FIG. 7 is a graph showing a third F-D curve C3 corresponding to a relationship between the thickness deformation amount and the reaction force of the battery stack 110.

The magnitude of the reaction force of the single battery cell 111 may be equal to the magnitude of the load applied from the single battery cell 111 to the end plate 121.

The X-axis of the graph shown in FIG. 6 is the thickness deformation amount of the single battery cell 111, and because the single battery cell 111 is in limited state, the minimum value of thickness deformation amount may be 0 and the maximum value may be L2−L1. Additionally, the Y-axis of the graph shown in FIG. 6 is the reaction force of the single battery cell 111, and when the thickness deformation amount of the single battery cell 111 is 0, it is the maximum value F1, and when the thickness deformation amount of the single battery cell 111 is L2−L1, it is 0. That is, the thickness deformation amount 0 of the single battery cell 111 in limited state represents that the stiffness of the end plate 121 pressing the battery stack 110 in two directions is so high that the expansion of the single battery cell 111 is completely limited.

Additionally, the reaction force 0 of the single battery cell 111 in limited state represents that the stiffness of the end plate 121 is too low to affect the expansion of the single battery cell 111 from the first thickness L1 to the second thickness L1. Here, the unit of the X-axis is the unit of length (e.g. 'mm'), and the unit of the Y-axis is the unit of force or weight (e.g. 'kgf').

The second F-D curve C2 shown in FIG. 6 may be obtained by iteratively performing the process of measuring the thickness while continuously or discretely increasing or decreasing the load applied to each of the plurality of battery cells 111 in limited state.

The graph of FIG. 7 shows a third F-D curve C3, and may correspond to a result of correcting the second F-D curve of FIG. 6 based on the total number (=n) of battery cells 111 included in the battery stack 110. That is, it is obvious that when the number of battery cells 111 included in the battery stack 110 is 2 or more, the maximum value M of thickness deformation amount of the battery stack 110 is larger than the maximum value L2−L1 of thickness deformation amount of the single battery cell 111, and the maximum value F2 of reaction force of the battery stack 110 is larger than the maximum value (F1, see FIG. 6) of reaction force of the single battery cell 111.

The control unit 230 may generate data representing the third F-D curve C3 shown in FIG. 7 based on data representing the second F-D curve C2 shown in FIG. 6 and the number of battery cells 111 included in the battery stack 110. For example, when the first parameter=n, a line passing through two points F2 and M that are n times for each of x and y-intercepts of the second F-D curve shown in FIG. 6 may be the third F-D curve of FIG. 7.

Although FIGS. 6 and 7 show that each of the second F-D curve C2 and the third F-D curve C3 has a shape of a straight line, this is provided for illustration only, and it should be understood that the shape of the second F-D curve C2 and the third F-D curve C3 may change depending on the structure and material of the battery cell 111.

Figure 8:
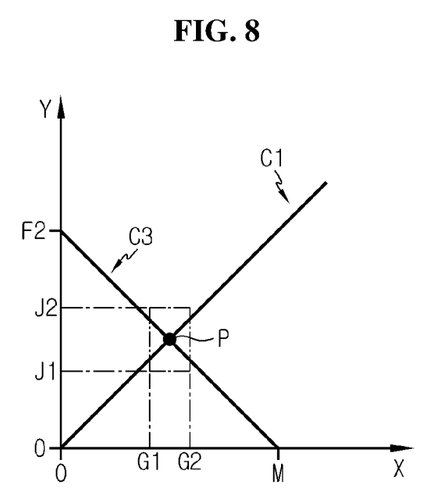
FIG. 8 is a diagram in relation to the operation of testing an end plate by a testing apparatus according to an embodiment of the present disclosure.

FIG. 8 is a diagram in relation to the operation of testing the end plate 121 by the testing apparatus 200 according to an embodiment of the present disclosure. That is, FIG. 8 is a reference diagram in describing the operation of evaluating if the end plate 121 has a proper range of stiffness to support the battery stack 110 in two directions.

Referring to FIG. 8, a relationship between the exemplary first F-D curve C1 and the third F-D curve C3 shown in FIG. 7 can be seen. As described above, because the first F-D curve C1 shows a relationship between the deformation amount and the load of the end plate 121, the deformation amount of the end plate 121 and the load applied to the end plate 121 may have a proportional relationship. Additionally, because the third F-D curve C3 shows a relationship between the deformation amount and the reaction force of the battery stack 110, the deformation amount of the battery stack 110 and the reaction force of the battery stack 110 may have an inverse proportional relationship.

Accordingly, as shown in FIG. 8, the first F-D curve and the third F-D curve intersect at a point P. On the point P at which the first F-D curve and the third F-D curve intersect, the load applied from the battery stack 110 to the end plate 121 and the load applied from the end plate 121 to the battery stack 110 reach equilibrium.

The control unit 230 may calculate the coordinates of the point P at which the first F-D curve C1 and the third F-D curve C3 intersect. Additionally, the control unit 230 may determine the load applied to the end plate 121 while n battery cells 111 represented by the first parameter are in limited state and the battery stack 110 and the end plate 121 reach equilibrium, and its consequential deformation amount of the end plate 121 based on the calculated coordinates of the intersection point P. That is, the x value of the coordinates of the intersection point P is the deformation amount of the end plate 121, and the y value is the load applied to the end plate 121.

The control unit 230 may compare the coordinates of the intersection point P with a reference range. That is, the control unit 230 may determine if the intersection point P is located within a reference range. The memory unit 220 may store information associated with at least one of a first reference range and a second reference range for use in evaluating the strength of the end plate 121. The first reference range may be defined by a lower limit value G1 and an upper limit value G2 associated with the deformation amount of the end plate 121, and the second reference range may be defined by a lower limit value J1 and an upper limit value J2 associated with the load applied to the end plate 121. That is, when the x value of the intersection point P is located in the first reference range and the y value of the intersection point P is located in the second reference range, the end plate 121 is determined to have sufficient stiffness to pass the design standard, and in other instances, the end plate 121 is not determined to have sufficient stiffness to pass the design standard. Of course, in case that only information associated with the first reference range is stored in the memory unit 220, when the x value of the intersection point P is located in the first reference range, the processor 230 may determine that the end plate 121 has sufficient stiffness to pass the design standard irrespective of the y value of the intersection point P.

When the coordinates of the intersection point P are in the preset first and second reference ranges, the control unit 230 may output a first test result signal. The first test result signal may notify that the end plate 121 passes the predefined design standard.

In contrast, when the coordinates of the intersection point P are outside of the first reference range or the second reference range, the control unit 230 may output a second test result signal. The second test result signal may notify that the end plate 121 fails to pass the predefined design standard.

The x axis value of the intersection point P larger than the upper limit value G2 of the first reference range and/or the y axis value of the intersection point P smaller than the lower limit value J1 of the second reference range may represent that the stiffness of the end plate 121 is insufficient. Accordingly, when the x axis value of the intersection point P is larger than the upper limit value of the first reference range or the y axis value of the intersection point P is smaller than the lower limit value of the second reference range, the control unit 230 may output a third test result signal notifying that at least one of a decrease in the first parameter and an increase in the third parameter is necessary.

The x axis value of the intersection point P smaller than the lower limit value G1 of the first reference range and/or the y axis value of the intersection point P larger than the upper limit value J2 of the second reference range may represent that the stiffness of the end plate 121 is too much. Accordingly, when the x axis value of the intersection point P is smaller than the lower limit value of the first reference range or the y axis value of the intersection point P is larger than the upper limit value of the second reference range, the control unit 230 may output a fourth test result signal notifying that at least one of an increase in the first parameter and a decrease in the third parameter is necessary.

Along with or apart from the operation of outputting the second to fourth test result signals, the control unit 230 may adjust at least one of the first parameter and the third parameter. For example, the control unit 230 may perform at least one of the operation of decreasing the first parameter by a first value or the operation of increasing the third parameter by a second value before and after outputting the third test result signal. As another example, the control unit 230 may perform at least one of the operation of increasing the first parameter by a third value or the operation of decreasing the third parameter by a fourth value before and after outputting the fourth test result signal. In this instance, the first to fourth values are a positive number and may be preset.

Figure 9:
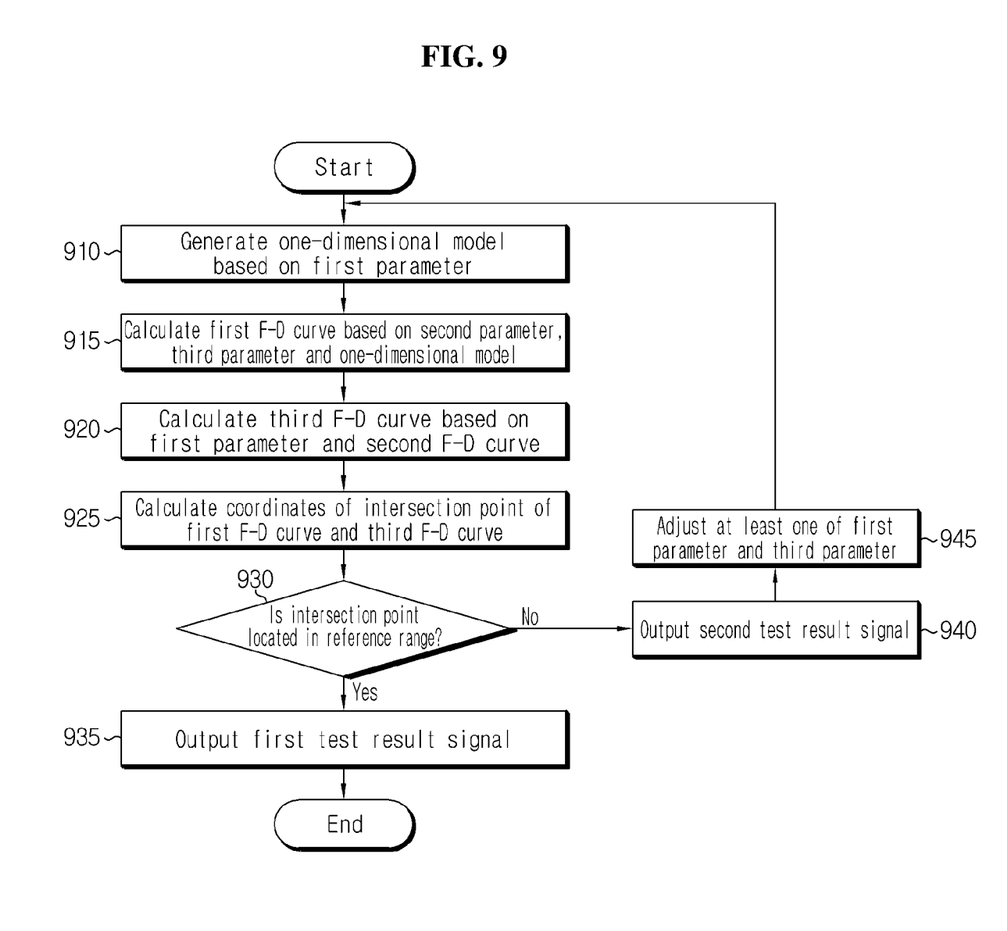
FIG. 9 is a schematic flowchart of a method for testing an end plate according to another embodiment of the present disclosure.

FIG. 9 is a schematic flowchart of a method for testing the end plate 121 according to another embodiment of the present disclosure.

In 910, the control unit 230 generates a one-dimensional model associated with the battery module 100 based on a first parameter. The first parameter represents the number of battery cells 111 included in the battery module 100. Additionally, the one-dimensional model simulates a structure in which the front surface and the rear surface of the battery stack 110 including the number of battery cells 111 represented by the first parameter stacked in sequential order are supported on the opposite sides by two end plates 121-1, 121-2.

In 915, the control unit 230 calculates a first F-D curve based on a second parameter, a third parameter and the one-dimensional model. The second parameter represents the spring constant of the single battery cell 111, and the third parameter represents the spring constant of the end plate 121. Additionally, the first F-D curve corresponds to a relationship between a deformation amount and a load of the end plate 121 according to the number of battery cells 111 represented by the first parameter. The control unit 230 may store first reference data representing the calculated first F-D curve in the memory unit 220.

In 920, the control unit 230 may calculate a third F-D curve based on the first parameter and a second F-D curve. The control unit 230 may determine the second F-D curve from second reference data pre-stored in the memory unit 220. The second F-D curve corresponds to a relationship between a deformation amount and a reaction force of the single battery cell 111, and the third F-D curve corresponds to a relationship between a deformation amount and a reaction force of the battery stack 110. The deformation amount of the battery stack 110 is a result of reflecting respective swelling of the battery cells 111 included in the battery stack 110.

In 925, the control unit 230 calculates the coordinates of an intersection point of the first F-D curve and the third F-D curve. The intersection point represent equilibrium between a reaction force of the battery stack 110 and a force applied by the end plate 121. The control unit 230 determines a deformation amount and a load of the end plate 121 caused by swelling of the number of battery cells 111 represented by the first parameter based on the calculated coordinates of the intersection point. The load of the end plate 121 corresponds to the force applied to the battery stack 110 by the end plate 121.

In 930, the control unit 230 determines if the intersection point is located within a preset reference range.

In 935, when the coordinates of the intersection point are in the preset reference range, the control unit 230 outputs a first test result signal. The first test result signal may notify that the end plate 121 passes the predefined design standard. After 935, the method ends.

In 940, when the coordinates of the intersection point is outside of the reference range, the control unit 230 outputs a second test result signal. The second test result signal may notify that the end plate 121 fails to pass the predefined design standard.

In 945, the control unit 230 adjusts at least one of the first parameter and the third parameter. In this instance, an amount of increase or decrease of the first parameter or the third parameter may be determined by the control unit 230 from a relationship between the intersection point and the reference range. When the first parameter is adjusted in 945, the method reverts to 910. In contrast, when only the third parameter is adjusted, the control unit 230 reverts to 915 instead of 910.

The embodiments of the present disclosure described hereinabove are not implemented only through the apparatus and method, and may be implemented through programs that realize functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

What is claimed is:

1. An apparatus for testing an end plate mounted in a battery module, comprising:

a memory unit configured to store a first parameter representing the number of battery cells included in the battery module, a second parameter representing a spring constant of a battery cell of the battery cells included in the battery module and a third parameter representing a spring constant of the end plate; and a control unit configured to generate a one-dimensional model associated with the battery module based on the first parameter, calculate a first force-distance (F-D) curve based on the second parameter, the third parameter and the one-dimensional model, and store first reference data representing the first F-D curve in the memory unit, wherein the first F-D curve corresponds to a relationship between a deformation amount and a load of the end plate according to the number of battery cells represented by the first parameter.

2. The apparatus for testing an end plate according to claim 1, wherein the one-dimensional model is to simulate a structure in which a front surface and a rear surface of a battery stack are supported by the end plate, the battery stack including the number of battery cells represented by the first parameter stacked in a sequential order.

3. The apparatus for testing an end plate according to claim 2, wherein the control unit is configured to calculate an equivalent spring constant of the one-dimensional model using:

$$K_{eq} = \frac{K1 \times K2}{(2 \times K1) + (n \times K2)}$$

wherein Keq is the equivalent spring constant, n is the number of battery cells, K1 is the spring constant of the battery cell, and K2 is the spring constant of the end plate.

4. The apparatus for testing an end plate according to claim 3, wherein the control unit is configured to calculate the first F-D curve using:

$$F = K_{eq} \times n \times \Delta x_c = K2 \times \Delta x_e$$

wherein F is a load applied to the end plate, $\Delta x_c$ is a deformation amount of the battery cell, and $\Delta x_e$ is a deformation amount of the end plate.

5. The apparatus for testing an end plate according to claim 4, wherein the memory unit is further configured to store second reference data representing a second F-D curve, the control unit is configured to calculate a third F-D curve based on the first parameter and the second F-D curve, the second F-D curve corresponds to a relationship between a deformation amount of the battery cell and a reaction force of the battery cell, and the third F-D curve corresponds to a relationship between a deformation amount of the battery stack and a reaction force of the battery stack.

6. The apparatus for testing an end plate according to claim 5, wherein the control unit is configured to calculate coordinates of an intersection point of the first F-D curve and the third F-D curve, and determine the deformation amount and the load of the end plate caused by swelling of the number of battery cells represented by the first parameter based on the coordinates of the intersection point.

7. The apparatus for testing an end plate according to claim 6, wherein the control unit is configured to output a first test result signal when the coordinates of the intersection point are within a preset reference range, and the first test result signal notifies that the end plate passes a predefined design standard.

8. The apparatus for testing an end plate according to claim 6, wherein the control unit is configured to output a second test result signal when the coordinates of the intersection point are outside of the preset reference range, and the second test result signal notifies that the end plate fails to pass a predefined design standard.

9. The apparatus for testing an end plate according to claim 6, wherein the control unit is configured to adjust the first parameter when the coordinates of the intersection point are outside of a preset reference range.

10. The apparatus for testing an end plate according to claim 6, wherein the control unit is configured to adjust the third parameter when the coordinates of the intersection point are outside of a preset reference range.

11. The apparatus for testing an end plate according to claim 1, wherein the control unit is configured to calculate an equivalent spring constant of the one-dimensional model, and calculate the first force-distance (F-D) curve based on the second parameter, the third parameter and the equivalent spring constant of the one-dimensional model.

* * * * *